United States Patent [19]
Zapf

[11] 3,980,394
[45] Sept. 14, 1976

[54] STEREO VIEWING

[76] Inventor: Kenyon L. Zapf, 1954, 18th Ave., Vero Beach, Fla. 32960

[22] Filed: July 7, 1975

[21] Appl. No.: 593,490

Related U.S. Application Data

[63] Continuation-in-part of Ser. No. 406,846, Oct. 16, 1973, abandoned, which is a continuation-in-part of Ser. No. 817,662, April 21, 1969, abandoned.

[52] U.S. Cl. .................................. 350/139; 350/75; 350/76; 350/141; 350/143
[51] Int. Cl.² ..................... G02B 27/22; G02B 7/06; G02B 7/12
[58] Field of Search ............... 350/75, 76, 139, 141, 350/143

[56] References Cited
UNITED STATES PATENTS

| | | | |
|---|---|---|---|
| 1,808,176 | 6/1931 | Pieper et al. | 350/139 |
| 2,336,288 | 12/1943 | Peterson | 350/141 X |
| 2,787,191 | 4/1957 | Horton et al. | 350/141 |
| 2,814,966 | 12/1957 | Crossley | 350/135 |
| 3,376,381 | 4/1968 | Ratliff | 350/143 X |

FOREIGN PATENTS OR APPLICATIONS

| | | | |
|---|---|---|---|
| 599,029 | 3/1948 | United Kingdom | 350/139 |

*Primary Examiner*—Paul A. Sacher
*Attorney, Agent, or Firm*—Charles Hieken; Jerry Cohen

[57] ABSTRACT

A stereoscopic camera having wide angle lenses separated by the normal interpupillary distance photographs a scene on separate 38 mm-square frames of 120-size film strip to provide a left slide and a right slide. The stereoscopic viewer for viewing these slides has separate left eye and right eye assemblies with wide angle lenses having the same focal length as the lenses in the camera and separate supports for the slides. Each of the lenses is individually focusable and provides a borderless, circular field of view. The respective assemblies are relatively displaceable to enable the observer to set the interpupillary distance that best suits him. The slides are illuminated with light reflected from a generally cylindrical opaque screen and originating from a light bulb substantially at the axis of the cylindrical screen.

29 Claims, 5 Drawing Figures

INVENTOR
KENYON L. ZAPF
BY
Wolf, Greenfield, Hieken & Sacks
ATTORNEYS

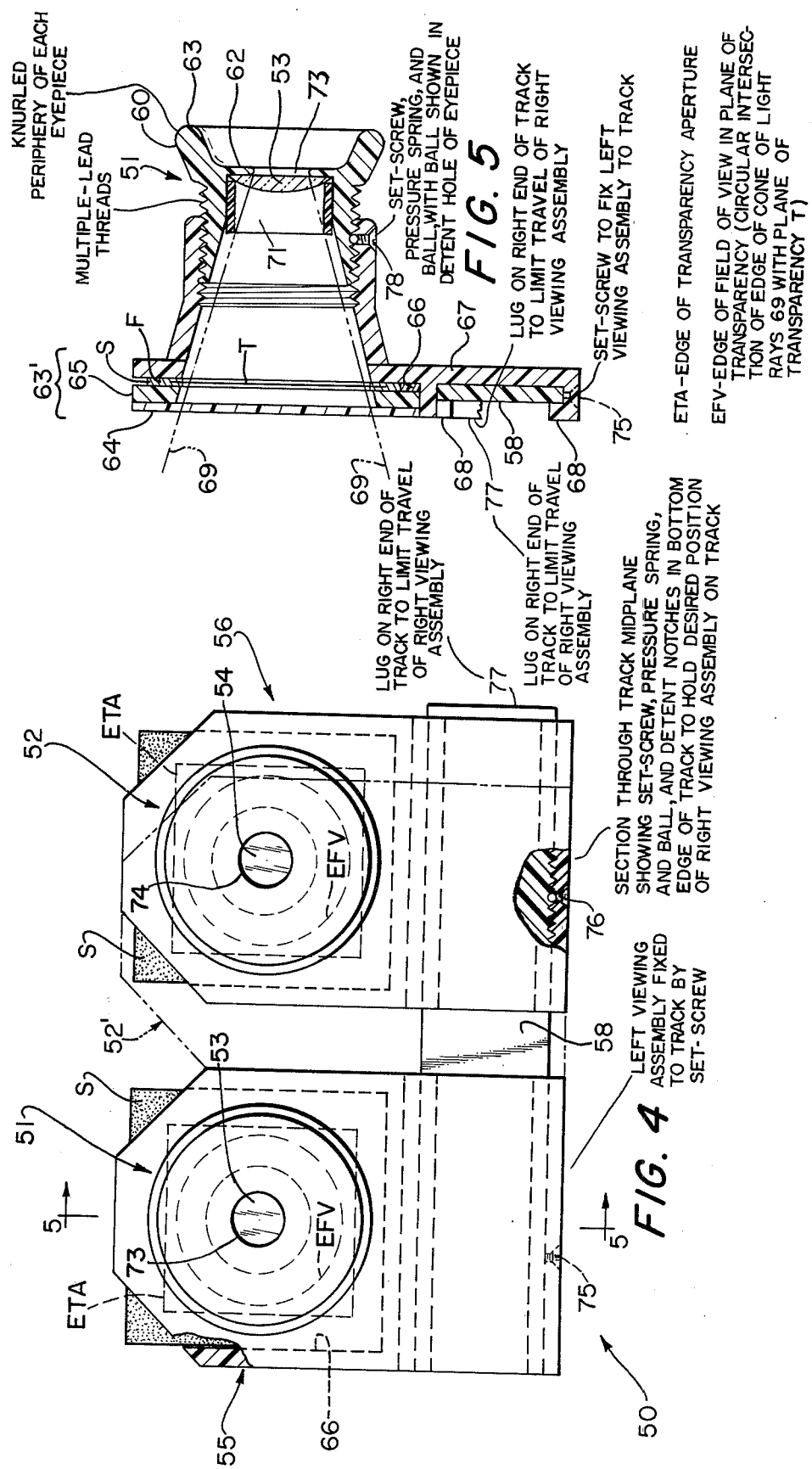

STEREO VIEWING

CROSS REFERENCE TO RELATED APPLICATIONS

This is a continuation-in-part of my copending application, Ser. No. 406,846, filed Oct. 16, 1973, now abandoned, which was a continuation-in-part of my earlier application, Ser. No. 817,662, filed Apr. 21, 1969, now abandoned.

BACKGROUND OF THE INVENTION

The present invention relates in general to stereoscopic photography and more particularly concerns novel methods and means for stereoscopically photographing a scene and viewing that scene with remarkable realism, the stereoscopic field that is viewed being embraced by an exceptionally large viewing angle. An observer may adjust the interpupillary distance to suit him easily and quickly and also adjust focus for each eye separately. The illumination system uniformly backlights the slides being viewed with great efficiency from a single flashlight bulb.

Stereoscopic photography and viewing is well known. In a typical system the stereoscopic slides are framed in a common frame a fixed distance apart. While such stereoscopic systems provide pictures that are more pleasing than ordinary two dimensional slides, they are less pleasing than desired. The observer sees a scene that is three dimensional and rectangularly framed by a visible border within a relatively small solid angle, much as one sees a scene on a stage in a theatre instead of the circularly framed wide angle scene that one observes in real life. Such borders may comprise slide aperture edges or similar limiting means. Many such prior art instruments are described in Judge, "Stereoscopic Photography", 3d Edn. Rev. (Chapman & Hall Ltd., London, 1950). For a general analysis see Hardy and Perrin, PRINCIPLES OF OPTICS (McGraw-Hill, 1932), Chapter XXV, STEREOSCOPY, particularly Section 191 on The Theory of Stereoscopy.

Although they include means for accommodating different interpupillary distances, most prior art stereoscopes keep the left and right frames in fixed relationship to one another so that some observers see the three dimensional image at the wrong distance. Usually focusing of both eyepieces is accomplished simultaneously. Conventional stereoscopic viewers thus are not easily adaptable to a wide variety of people with different eye refractive power.

Still another disadvantage of conventional viewers is that efficient diffused illumination of the entire slide surfaces is difficult to achieve.

U.S. Pat. No. 1,808,176 dated June 2, 1931, describes a stereoscopic instrument manufactured for a time by the Ritter Dental Manufacturing Company, Inc., of Rochester, New York, as their "Intra-Oral Stereoscope" primarily for the study of stereoscopic dental X-ray films, although the patent description suggests its possible use for scenic stereo photographs also. When the Ritter instrument is focused for unaccommodated normal (emmetropic) vision on the film plane, one sees in the field of view part of the outer vertical edges of the film apertures of the instrument as well as part of the vertical edges of the retaining frame for the diffuser glass. In addition, the observer is quite aware of the effect of looking through a larger pipe into the field of view and notices that the front end of this "pipe" intrudes into the field of view and is in fairly sharp focus. The "pipe" is the stereoscopic image of the two lens tubes.

U.S. Pat. No. 3,376,381 dated Apr. 2, 1968, of H. L. Ratliff, Jr., provides for separate lateral motion of viewing lenses and kinescope screens, rather than keeping left lens and screen together and right lens and screen together.

British Pat. No. 599,029 dated Mar. 3, 1948, to Lane proposes a stereoscope hinged at the middle in front and provided with means for slightly altering the angle between the two lens-and-film units in order to accommodate a range of interpupillary distances. In the disclosure he suggests, "It can be arranged that the two units always remain parallel to each other and that they be moved nearer together or farther apart to suit eyes of differing separations . . . "

U.S. Pat. No. 2,484,591, granted Oct. 11, 1949 to S. I. Rochwite, and its commercial embodiment, the Stereo Realist system, has lenses of 35 mm focal length with parallel axes 70 mm apart in its camera, and its stereoscope uses lenses of about 42 mm focal length. Objects in the stereoscopic virtual image appear somewhat too small and somewhat too far away; that is, perspective is distorted. The system uses slides having rectangular apertures a fixed distance apart and mounts the transparencies a fixed distance apart in those apertures; this creates in the stereoscope the effect of a scene observed through a window some distance away. Separation of infinity points in Realist slide transparencies is 63.5 mm and the distance between corresponding aperture points is 62 mm. The stereoscope provides for a range of interpupillary distances from 59.5 to 66.5 mm.

The Realist type system precludes the achievement of orthostereoscopic results. Only an observer with interpupillary distance of 63.5 mm can align his visual axes and the stereoscope lens axes with the infinity points of the two transparencies and thus fuse at infinity the left and right images of a point that was at infinity in the original scene; even when he does that all nearer points will appear at incorrect distances. What happens when the observer's interpupillary distance is not 63.5 mm is even worse distortion of perspective. If one switches rapidly back and forth throughout the range of inter-lens-axis displacement while watching the stereoscopic virtual image, in order to obtain the optimum setting, a minor disadvantage of the fixed slide aperture separation and fixed transparency separation combined with variable interlens distance is resultant eye discomfort. Also, a very near object in a scene appears to be much closer than the "window" described earlier. For instance, branches of a tree in spring bloom can seem to protrude through the window toward the observer. This case might be acceptable if it were thought of as an artistic arrangement. But the same phenomenon in a closeup portrait of a person's head and neck might be called "the Sir Walter Raleigh effect"; the human experience tells the observer that a bodyless head floating in space on the near side of a window is strangely abnormal. Precise alteration of the transparency separation distance and of the aperture separation distance has been proposed by some to overcome such unreality. The problem of the "window", perspective distortion, and other disadvantages characterize the prior art.

Accordingly, it is an important object of this invention to provide an improved stereoscopic system that overcomes one or more of the disadvantages enumerated above.

It is a further object of the invention to provide an exceptionally realistic stereoscopic system consistent with the preceding object.

It is a further object of the invention to give the viewer an exceptionally wide angle of viewed field in true perspective, consistent with one or both of the preceding objects.

It is a further object of the invention to achieve one or more of the preceding objects while uniformly illuminating the slides in an efficient manner.

It is a further object of the invention to provide a stereoscopic viewer in accordance with one or more of the preceding objects that permits the user to individually adjust the focus for each eye.

It is a further object of the invention to achieve one or more of the preceding objects while allowing the user to adjust spacing between left and right viewing assemblies for optimum interpupillary distance.

It is still a further object of the invention to achieve one or more of the preceding objects while uniformly backlighting both left and right slides.

It is still a further object of the invention to achieve the preceding object with a relatively low cost bulb as the source of the light energy.

SUMMARY OF THE INVENTION

According to the invention, there are left and right viewing assemblies. Each assembly includes lens means and support means for supporting a slide in fixed relationship to the lens means. There is case means having means for supporting the left and right viewing assemblies while allowing relative displacement between them to adjust interpupillary distance.

Preferably, the case means carries a generally spherical or cylindrical opaque matte white screen for reflecting light from a source along the axis of the screen upon the slides when in the slide support means.

If a stereoscopic camera and viewer are to provide a stereoscopic image in which the object photographed is to appear undistorted and at the proper distance, the separation of the camera lens axes and the stereoscope lens axes must equal the observer's interpupillary distance, and the net angular magnification of the combination of camera and stereoscope must equal unity. In the case of lenses having focal length in the neighborhood of 35 mm or less, the magnification requirement can be met with sufficient precision by the use of viewer lenses of the same focal length as that of the camera lenses. As illustrated in Hardy and Perrin, the conventional stereoscopic camera has parallel lens axes, which cause axial points in the object space to be imaged the same distance apart as the lens axes.

According to the invention, these axial points are projected axially forward into the stereoscopic virtual image space by the stereoscope lenses along parallel axes coaxial with the observer's visual axes, to be seen properly in the stereoscopic virtual image space. The latter relationship is maintained in all interpupillary adjustments.

Preferably, the lens means are wide angle lenses and have the same viewing angle and focal length as the lenses in the stereoscopic camera taking the original slides.

Numerous other features, objects and advantages of the invention will become apparent from the following specification when read in connection with the accompanying drawing in which:

BRIEF DESCRIPTION OF THE DRAWING

FIG. 4 is a front view of a second embodiment of the invention; and

FIG. 5 is a cross section view taken as indicated by arrow 5—5 in FIG. 4.

DETAILED DESCRIPTION OF PREFERRED EMBODIMENTS

Figure 1:
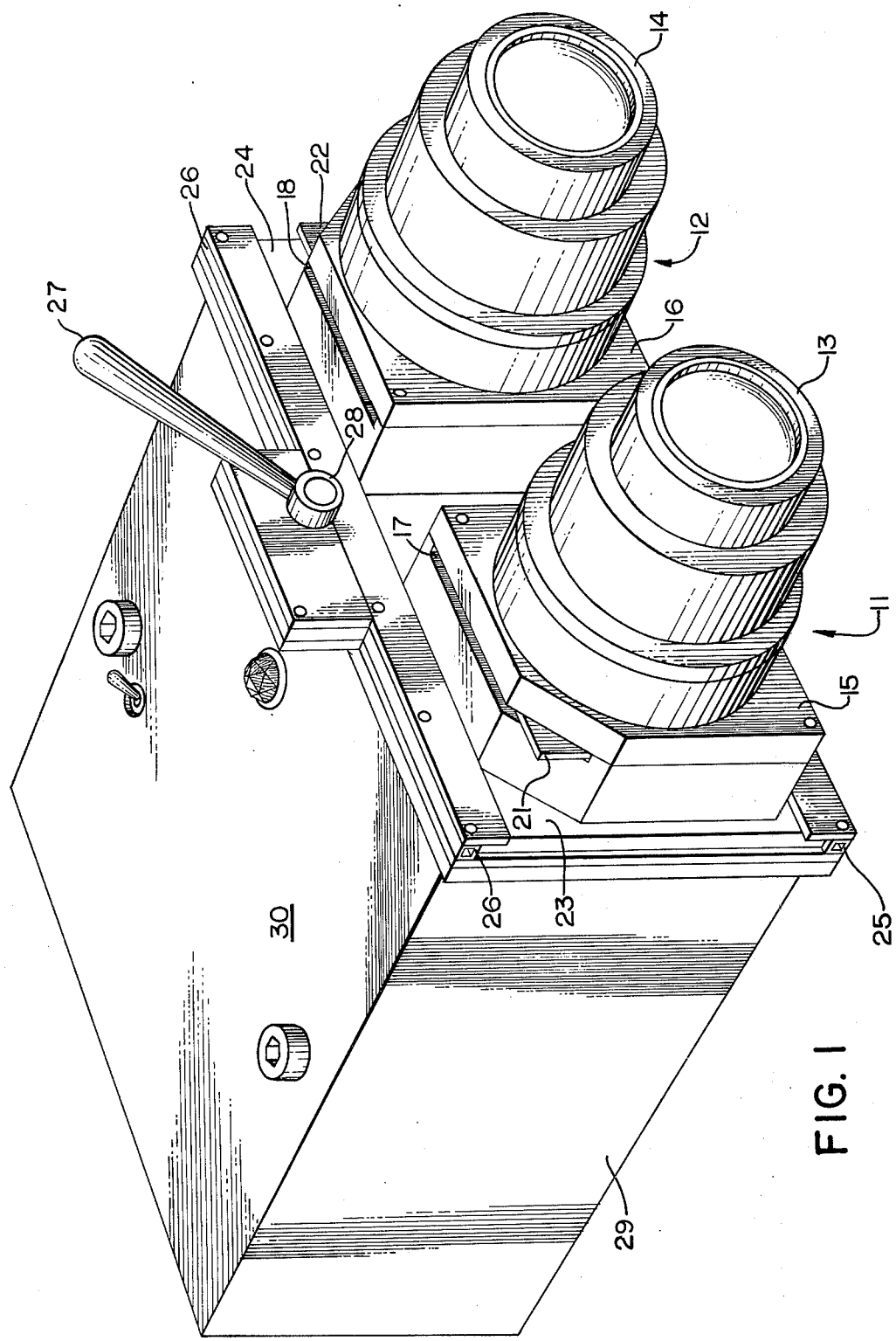
FIG. 1 is a perspective view of a stereoscopic viewer according to the invention.

With reference now to the drawing and more particularly FIG. 1 thereof, there is shown a perspective view of a viewer according to a first embodiment of the invention. The invention includes a left viewing assembly 11 and a right viewing assembly 12 having a left lens 13 and right lens 14. The lenses 13 and 14 are screwed into a threaded opening in slide support assemblies 15 and 16, respectively, each having slots 17 and 18, respectively, accommodating transparency slides 21 and 22, respectively. The slide support assemblies 15 and 16 are secured to base plates 23 and 24, respectively, which ride in lower track 25 and upper track 26 of the front of the main support housing 29. The top cover 30 covers slide illumination system described below.

Figure 2:
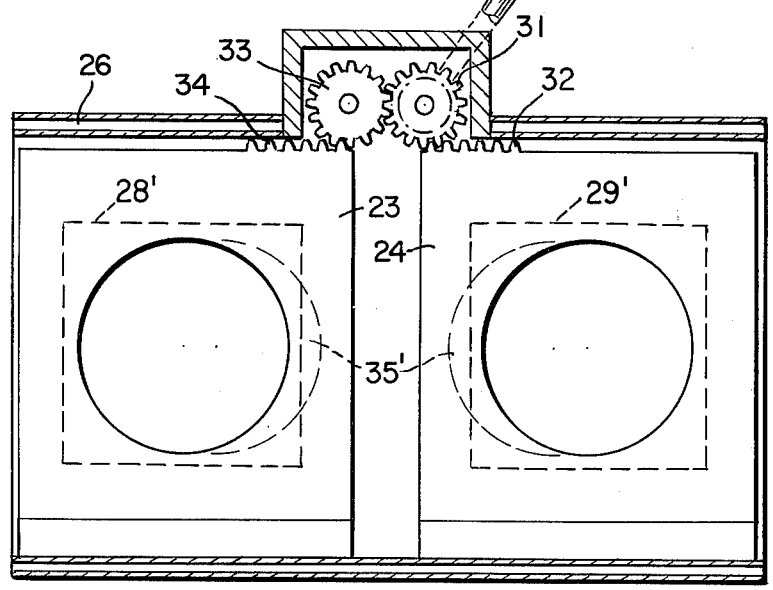
FIG. 2 is a sectional view of the FIG. 1 viewer at the location and in the direction indicated at 2—2 in FIG. 3.

Referring to FIG. 2, there is shown a front sectional view of the invention with a cover plate over the rack and pinion interpupillary adjusting means removed and the lens assemblies removed for better showing the mechanism for effecting interpupillary adjustment. A lever 27 extends from hollow shaft 28 that is secured to a right gear 31. Right gear 31 meshes with right rack 32 on right base plate 24 and with left gear 33 which in turn meshes with rack 34 on base plate 23. Thus, moving lever 27 down reduces the interpupillary distances as indicated by the dashed lines 35', while raising lever 27 increases the interpupillary distance to the maximum separation shown in FIG. 2. The circular fields of view of the lenses in their focal plane are slightly less in diameter than the square apertures 28' and 29' of slides 21 and 22, respectively.

Figure 3:
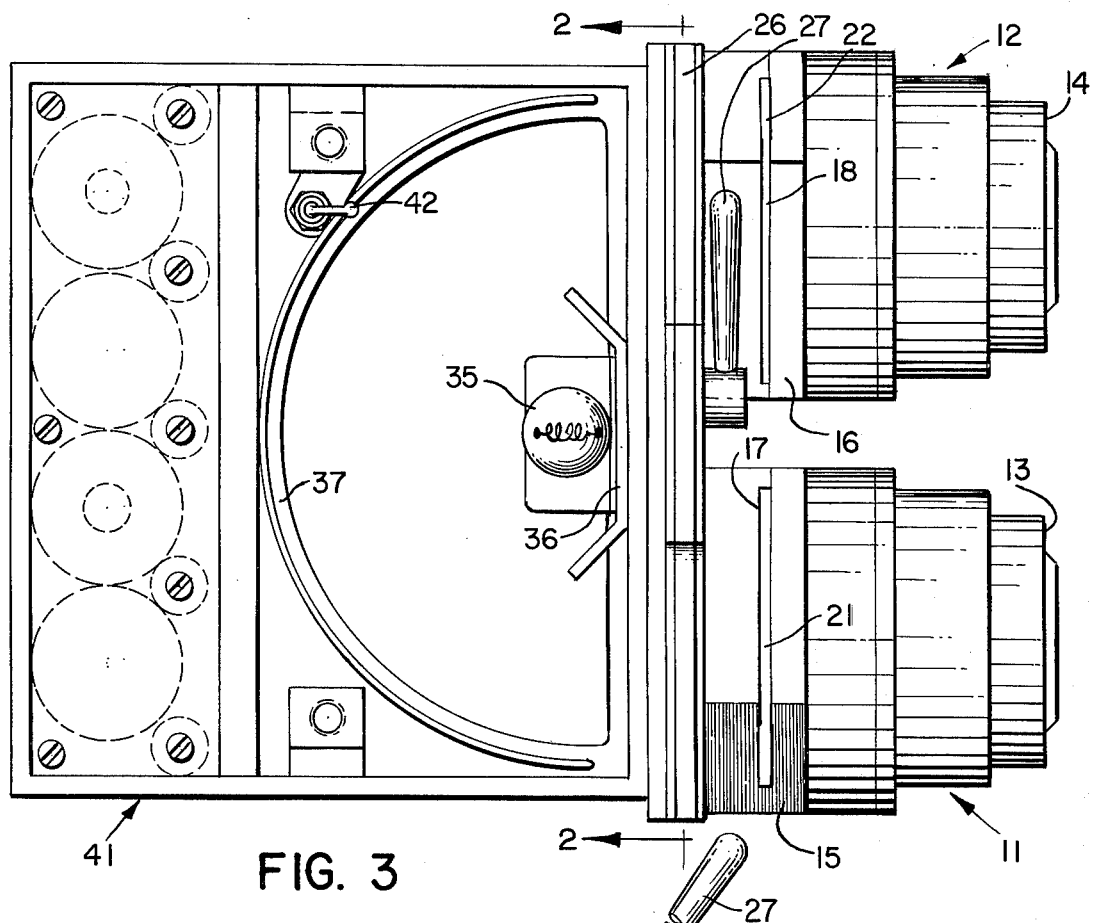
FIG. 3 is a top view of the FIG. 1 viewer with the top cover removed to illustrate the illuminating scheme according to the invention.

Referring to FIG. 3, there is shown a top view of of stereoscopic viewer according to the invention with cover plate 30 removed. The source of illumination is a flashlight bulb 35 being along the axis of the screen. Details of the electrical connections are not shown. A battery compartment 41 contains four flashlight cells connected in series. Turning toggle switch 42 to the on position energizes bulb 35 to uniformly illuminate slides 21 and 22 after reflection from screen 37. Preferably the filament of bulb 35 is aligned with its plane perpendicular to the plane of slides 21 and 22. This can be accomplished by rotating the socket on its base.

Each of the lenses may be individually adjusted so that a person with eyes having different focusing properties sees the scene through both eyes in focus. Furthermore, the individual may adjust the interpupillary distance to conform to his own. To this end having the slides 21 and 22 relatively displaceable is an important feature.

Another important feature of the invention resides in using wide angle lenses for lenses 13 and 14. Preferably these lenses have the same viewing angle and focal length as the lenses in the camera which took the scenes being viewed. Details of the camera are not shown because any stereoscopic camera may be used to practice the invention, preferably using wide angle lenses of the same focal length that will be used in the stereoscopic viewer.

According to the preferred method of the invention, one photographs a scene with a stereoscopic camera having left and right wide angle lenses of the same focal length and viewing angle as the viewer, develops the film to make respective left and right slides as seen through the left and right lenses of the camera, puts the left and right slides into the slots 17 and 18, respectively, turns on switch 42, and then adjusts the focus of each of lens 13 and 14 and the interpupillary distance by adjusting lever 27 until the focused scene merges into one. The resultant picture with an embodiment of the invention actually constructed is breathtaking and gives the observer the impression that he is actually viewing a scene, unlike the view of a stage as seen with conventional stereoscopic equipment.

The invention is characterized by many additional features. It uses separate slides for the left and right half of the pictures. These slides are standard 2 × 2 with 38 mm square "superslide" aperture, and thus can be shown in standard slide projectors. Mounting the respective viewing lenses and slide carriers as separate units and permitting their optical axes to be separated horizontally accommodates the interpupillary distance of virtually any observer. This arrangement avoids the distortion of apparent position of the picture subject that can occur with a conventional system using a fixed separation of the left and right pictures of the stereo pair.

The field of view of the viewing lenses is preferably circular (although it could be slightly elliptical, preferably with the major axis horizontal), and in the plane of the transparencies it is slightly less in diameter than the horizontal and vertical dimensions of the square slide aperture. This prevents the observer from seeing the frame of the slide, thereby increasing the illusion of looking at the actual scene. The edge of the field of view is limited by the front inside edges of the lens retainer rings and is therefore out of focus. This additionally allows the observer to direct his attention to the scene and not be distracted by a sharp edge around the field of view. The wide viewing angle provides noticeably greater realism than conventional stereoscopes. Correct interocular setting is automatically achieved when the observer blends the left and right fields of view into one. At the same time, the observer experiences the most comfortable feeling.

Focusing of the lenses is done individually by helical screw threads on their mounts to permit compensation for individuals having unequal refractive power in their two eyes.

Uniform illumination of the two slides is provided by the cylindrical diffuse white reflecting screen and a miniature lamp whose filament is on the axis of the reflector and in its horizontal midplane. Power supplied to the lamp by the dry cells is controlled by a toggle switch that permits the observer to keep the view illuminated as long as desired without tiring his finger by having to keep a switch depressed. The combination of a No. 27 lantern-type lamp and four 1.50 v. dry cells connected in series provides a satisfactory compromise between lamp color temperature and life of lamp and power source. A red jewel lens in the removable lid of the illuminating system box shows when power is on. Direct light from the lamp is prevented from reaching the slides by the baffle means 36.

According to a further embodiment of the invention, the parts 35, 36, 37, 42 and batteries in compartment 41 (FIG. 3) can be eliminated and replaced by a diffusing translucent screen mounted a few millimeters ahead of the transparency plane to provide a translucent back wall of the viewer. The stereoscope can be held up to external sources of natural or artificial light to pass diffused light therefrom. The screen, which may comprise a single pane or an assemblage of multiple panes, spreads light evenly over each slide.

In the above embodiments, the above described exterior light-admitting screen and the reflector 37 of FIG. 3 are both out of focus to the person using the viewing instrument because of their spacing from the slide mount slots 17 and 18, the focal planes of the lens systems.

According to a still further modification of the invention, relative movement between the right and left slide support assemblies may be made by adjusting only one of such assemblies while the other one remains fixed. For instance, left gear 33 and left rack 34 could be removed from the FIG. 2 apparatus and operation of handle 27 would displace right viewing assembly 12 only to adjust for a user's interpupillary spacing while maintaining parallelism of the optical axes of the right and left assemblies. Alternatively, one or both assemblies may be displaced without gears along a guiding slide rod or track, using frictional, detent-stop or key means to lock in a given adjustment.

The camera and viewer should preferably have the same angular coverage and same focal length. For an ordinary stereo camera a typical horizontal angular coverage is 33.4° and a typical vertical coverage is 36.6°. By wide angle as used herein it is meant a horizontal coverage greater than 35° and preferably at least 55°. An exemplary camera used Schneider Curtagon f/2.8 35 mm lenses with axes 2⅝ inches focusing images upon type 120 film apertured by superslide masks with 38 mm square openings. In an exemplary viewer the circular aperture formed by the inside diameter of the front edge of the retainer ring of the lens was 33 mm in diameter.

In order to learn more about the Lane and Realist stereoscope designs compared to the present invention, a Realist type stereoscope having fixed transparency aperture spacing (62 mm) and variable interpupillary lens-spacing, and a working model of the Lane front-hinged type, were made. These two viewers were designed to accept lenses of the identical formula and focal length of those used in the present invention. Next, appropriate stereoscopic color slides of an illuminated 18-inch globe of the earth (to serve as a simple geometric shape, the sphere) were made with the appropriate stereo camera companion. The Realist type stereo slide mount, it should be mentioned, is still accepted as standard by the Photographic Society of America; thus the performance of the Realist type viewer may be regarded as standard stereoscope performance. When the globe slides were observed with the Lane type stereoscope and the instrument was quickly run through its full range of interpupillary adjustment, the results were acute eye discomfort, and the size of the globe appearing to grow larger and smaller. Exactly the same results were obtained with the Realist type stereoscope. But when the same stereo pair of slides was observed with the prototype of the present invention, there was no eye discomfort at all induced by quick shifting from one end of the interpupillary range to the other, and this operation made it quite easy to find the optimum setting, and there was no detectable shift whatever in the apparent size or distance of the globe.

It appears from experiments that for a circular field of view, the minimum angular coverage needed to give the observer a realistic, uncrowded feeling is about 50°. As the angular coverage of the stereoscope lenses is increased, the realism increases, but with extremely rapid rise in lens cost.

It will be useful here to introduce an important subject treated in standard textbooks on optics, namely the theory of stops. Briefly, the passage of light or other radiant energy through an optical system is limited by apertures or stops, which are the clear openings through lenses or diaphragms in the system. The stop which we are concerned with here is called the field stop, for the reason that it limits the angular extent of the field of view of the instrument. The virtual image of the field stop formed by the lens or lenses on the exit side of that stop is called the exit window. Most, if not all, of the prior art stereoscopes deliberately place the field stops in the focal plane of the instrument. For instruments using opaque prints, the left and right pictures have sharp outlines, generally rectangular but sometimes with curved top edges; these outlines are the intended field stops, but actually in the old hooded type stereoscope the septum is visible, and in some also the picture-holding crossbar. In the Realist system, the transparencies are mounted in rectangular apertures that are a fixed distance apart in paper masks or in cardboard mounts; the apertures are the field stops. In both systems the separation of corresponding points of left and right field stops with respect to interpupillary distances of instrument and observer determines the apparent position in space of the stereoscopic virtual image of the pairs of field stops, and this virtual image is the exit window of the system and appears well in front of the observer, in what would have been the object space of the original scene. In both systems the separation of corresponding infinity points in left and right pictures determines the apparent position in space of objects in the stereoscopically recreated scene.

In the present invention, the lenses and their mounts are so chosen that they limit the field of view of the instrument, and the slides are so chosen that the field of view of the lenses excludes any part of the cardboard mounts of the slides; looking through the lenses, one sees apparently limitless transparencies, which blend into a single three-dimensional image. In other words, the present invention removes the field stops from the picture plane (the focal plane of the lenses) and brings them into the lenses, thus removing the exit window from space in front of the observer and bringing it so close to his eyes that it is practically unnoticeable.

In the present invention, lenses of the well known Erfle eyepiece type may be used, with focal length of 28 mm (the same as that of the lenses in the companion prototype camera) and angular coverage of about 62½°. For such wide coverage, they provide reasonably good definition. An inexpensive production model stereoscope may provide angular coverage of about 50° with acceptable definition through the use of achromatic doublet or one-piece plano-convex lenses.

Ordinarily a telescope consists of an objective lens to form a real image of a distant object, and an eyepiece to enlarge that image for the observer. The eyepiece also forms a real image of the objective lens, called the exit pupil, some distance beyond the eyepiece, and in order to see the full field of view of the objective lens, the observer must place the entrance pupil of his eye in the plane of this exit pupil of the system. In the case of a magnifier, which is a lens used to enlarge the appearance of a real object, there is no exit pupil; the angular size of the field of view seen by the observer depends on where he places his eye along the lens axis. Although lens abberrations dictate an optimum position for the eye, there is still some control over angular coverage through eye position, and the latter can be fixed by suitable eyeguards attached to or made part of the lens mounts; the observer gently rests his face against the guards. Most nearsighted or farsighted observers without astigmatism could obtain sharp stereoscopic images without glasses by appropriate focusing of left and right lenses of the stereoscope.

In the Erfle lens, the forward inner edge aperture of the front retaining ring appears to be the field stop, and its image produced by all the elements of the lens together is then the exit window. The retaining ring is just in front of the front glass element of the lens. That aperture, typically 33 mm. in diameter, is smaller than the inscribed circle within the square aperture, 38 mm. by 38 mm., of a slide mount. Typically, the plane of this aperture is only 5 to 6 mm. from the slide transparency plane when the lens is focused on the transparency, and this arrangement excludes any part of the cardboard slide mount from the field of view of the lens. In using the above stereoscope, one is only vaguely aware that the field of view is limited by a circular edge; that edge is so out of focus and appears so close to one's eyes that it seems almost a part of one's brow. In the case of an achromatic or plano-convex lens or similar relatively simple lens, the lens mount would be designed with a circular aperture of appropriate diameter (or possibly an elliptical aperture) in that part of the amount against which the rear surface of the lens bears, and the eyeguard part of the lens mount would be designed so that it, in combination with the aperture, would control the observer's angular coverage. The aperture would be both field stop and exit window, because no lenses lie between it and the observer's eye.

The Erfle formula lens used above had a distance from the focal plane (plane of the transparency) to the front end of the lens retainer ring equal to 6mm. and from the focal plane to the front clear aperture of the lens equal to 9mm. and to the rear clear aperture of the lens equal to 51mm. when the lens was focused on the transparency plane for normal (emmetropic) vision. The lens retainer ring had an inside diameter of 33 mm. and the intersection of that inside diameter with the flat front face of the retainer ring constituted the limiting aperture defining the field stop of the lens-and-slide optical system. The effective focal length of the lens was 28 mm. and resultant angular coverage slightly exceeded 60°. The depth of field of the lens is the range of axial motion of the lens with respect to the transparency which will provide tolerably sharp definition to the observer; this range is of the order of 2 mm., which is less than the above described 9 mm. spacing (focusing).

The slide was 50 mm. × 50 mm. and had a photograph aperture of 38 mm. × 38 mm. A circle of coverage of slightly more than 33 mm. diameter, which was uniformly illuminated, was obtained for the lenses in the focal plane of the lenses (coinciding with the plane of the transparencies).

The invention may be used with transparent or opaque pictorial representations bordered within cardboard mounting frames, white margins, print edges or other borders. Where opaque representations are used they should be illuminated from the lens side of the plane of the representations by sources which cannot be viewed through the lenses. Positives or negatives of outdoor or indoor scenes, X-rays, aerial photographs, hyperstereoscopic pictures, macro - and micro-stereophotographs, drawings, and instrument printouts are all within the scope of pictorial representations viewable by the present invention.

It is believed that prior to the present invention, there were no stereoscopes in which the virtual field space was not bounded at least in part by sharply defined straight lines or other lines which were obviously not part of the original real field space. This may have been a carry-over from the traditional artist's practice of making two-dimensional paintings on rectangular pieces of canvas. The left and right images of stereoscopes are made with generally rectangular borders (field stops) because pictures have always been made that way, and thus the rectangular exit "window" has become a traditional part of the virtual three-dimensional field space in stereoscopic photography. For the first time, the stereoscope described here removes from the field of view the traditional rectangular field stops and thus removes from the virtual stereoscopic field space the traditional rectangular exit window; both are simply gone. And the result is a substantial qualitative improvement in the realism of stereoscopic viewing. The field of view is now limited solely by inconspicuous edges of lenses or lens mount parts that behave as field stops, bringing the exit window out of the virtual field space and up to the observer's eyes.

The preferred combination for the present system is slides with rectangular, preferably square, apertures, and lenses with circular (including elliptical) fields of view. In combination with the elimination of the field stops from the focal plane and the limitation of the field of view by the lens stops, the present invention employs interpupillary adjustment with constantly parallel optical axes of the separate left and right units comprising lens and slide holder.

In some embodiments of the invention, glass planoconvex lenses with small apertures (about 15 mm. diameter) may be employed to afford a more economical eyepiece construction.

FIGS. 4–5 show such an embodiment. The viewer 50 comprises a left eye assembly 51 and a right eye assembly 52 carrying lenses 53 and 54, respectively, and mounts 55 and 56, respectively, for holding slides S. The assemblies are made as interchangeable units and the cross-section of assembly 51 in FIG. 5 would apply equally to assembly 52. The two assemblies are mounted on a track 58, and both assemblies may be movable on the track for interpupillary adjustment. Preferably one assemnbly, e.g. 51, is adhesively secured to the track and the other assembly 52 is movable between its position shown in solid lines and a position shown in chain lines at 52'.

Referring now to the cross section of assembly 51 in FIG. 5, lens 53 is plano-convex and has a field of view of about 50°. The lens is mounted in a holder 60 having an eye relief portion 63 terminating in an aperture-forming ring 62 which provides the field stop (aperture 73 for 51, 74 for 52) on the side of the lens away from the photographic transparency slide S rather than between the lens and transparency as in the FIGS. 1–3 embodiment. The slides S include a frame portion F surrounding the central transparency T.

The assembly 51 mounts lens holder 60 on a plate-like backing structure 63' having layers 64, 65, 66, 67 and gripping flanges 68 for engaging track 58, all said parts being preferably made of moldable or formable plastics. The layer 64 is white and translucent and has a thickness of about 1/16 inch. The layers 65, 67 are black and about ⅛ inch thick, and have circular apertures bounded by a conical surface lying along a single right circular cone which is coaxial with the lens axis and is a continuation of the conical inner surfaces of the lens holder 60 and the internally threaded receptacle, in which holder 60 is shown in its outermost focusing position in FIG. 5. When slide S is in viewing position, the inscribed circle of the square aperture of transparency portion T lies just inside and concentric with this conical surface. The layer 66 is also black and comprises a three-sided frame for centering the slide on the optical axis.

The viewer of FIGS. 4–5 is held up to put a light source behind the screen 64 while left and right slides S are inserted in the respective slide holders 66 of the left and right assemblies. The cone of light rays defining the observer's field of view is indicated at 69 for assembly 51 in FIG. 5 (and would be equivalent for assembly 52). The cone passes within portions T of the slides S but does not intersect the frames F of the slides nor any of the walls of layers 65, 66, 67.

The flanges 68 may be molded integrally with layer 67 as indicated in FIGS. 4–5 or as separate pieces bonded to layer 67. Alternatively the flanges may be formed on track 58 to engage corresponding recesses of layer 67 or any of the other layers of backing structure 63' of each assembly.

The dashed circles labelled EFV in FIG. 4 each show the edge of the field of view in the plane of each transparency, i.e. the circular intersection of the edge of each cone of light rays 69 with the plane of each transparency, and the dashed squares labelled ETA in FIG. 4 indicate the edges of the transparency apertures, showing further the exclusion of the limiting edge of each transparency from the field of view due to the limiting rays 69, which graze just the inside front edge of the lens retainer ring 71 and then enter the observer's eye. Moving the eyepieces inward makes the EFV circles smaller. Length and inside diameter of ring 71 control apparent position and degree of out-of-focus condition of the edge of the field of view. The eye-relief portion of the eyepiece, which may be designed to be axially adjustable, is used to position the observer's eye to accept limiting rays 69 but no wider cone of rays.

It is further shown in FIGS. 4–5, that for interpupillary adjustment, left viewing assembly 51 may be fixed in place by a set-screw 75 and that right viewing assembly 52 may be selectively moved and fixed in place by provision of a set-screw assembly 76 comprising a set-screw, pressure spring, locking ball, and detent notches in the bottom edge of track 58. A lug 77 on the right end of track 58 prevents movement of the right viewing assembly off the track.

Each eye-relief portion may be knurled on its outer surface, and the eyepiece may be provided with multiple-lead threads (e.g., 12 threads per inch with triple-lead, providing ¼-inch of axial motion per rotation) to speed focusing. A set-screw assembly 78 comprising set-screw, pressure spring and locking ball may be provided in each viewing assembly to eliminate eyepiece looseness and retain a focus setting, and a detent hole appropriately located in the eyepiece threads may be provided to receive the locking ball when the eyepiece reaches the outermost design focus position; the eyepiece can still be completely unscrewed for cleaning, however, if one so desires.

There has been described a novel stereoscopic system that realistically reproduces a scene in three dimensions to an observer. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the claims.

What is claimed is:

1. Stereoscopic apparatus comprising,
means defining left and right viewing assmblies,
each of said viewing assemblies carrying lens means and pictorial representation support means in fixed relationship, each of said lens means having an optical axis,
support means for carrying said left and right viewing assemblies with said lens means optical axes generally parallel,
means for relatively displacing said left and right viewing assemblies for establishing a desired interpupillary distance,
each of said viewing assemblies comprising slide support means for supporting a slide of a first area,
aperture means between said lens means and said slide support means of second area less than said first area,
said lens means being wide angle,
means for illuminating the rear of said left and right viewing assemblies,
said means for illuminating comprising an opaque screen exhibiting circular symmetry,
and a light bulb at the center of a circle included by said opaque screen.

2. Stereoscopic apparatus in accordance with claim 1 and further comprising reflecting means ahead of said light bulb for preventing direct illumination of said viewing assemblies.

3. Stereoscopic apparatus in accordance with claim 1 wherein the slide area is square and the aperture is circular of diameter slightly less than the length of the slide side and is centered within a projection of the square defined by the slide.

4. Stereoscopic apparatus in accordance with claim 3 wherein the horizontal viewing angle of each of said lens means is at least 35°.

5. Stereoscopic apparatus in accordance with claim 3 wherein the horizontal viewing angle of each of said lens means is at least 55°.

6. Stereoscopic apparatus comprising,
means defining left and right viewing assemblies,
each of said viewing assemblies carrying lens means and pictorial representation support means in fixed relationship and defining a plane of said representation coinciding with the depth of field of said lens means,
said means having optical axes,
support means for carrying said left and right viewing assemblies with said lens means optical axes generally parallel,
means for relatively displacing said left and right viewing assemblies for establishing a desired interpupillary distance,
each of said viewing assemblies comprising picture support means for supporting a picture of a first area,
and means for preventing the observer from seeing the border of the picture when supported in said means for supporting and thereby increasing the illusion of looking at the actual scene and comprising means for causing the edge of the field of view to be out of focus while the representation is in focus.

7. Stereoscopic apparatus in accordance with claim 6 wherein said means for preventing comprises field-stop-defining means on the lens means side of the plane of the representation and outside the depth of field of said lens means.

8. Stereoscopic apparatus in accordance with claim 7 wherein said field stop means are between said lens means and said plane.

9. Stereoscopic apparatus in accordance with claim 7 wherein said field stop means are located on the eye side of the lens means.

10. Stereoscopic apparatus in accordance with claim 9 wherein each of said lens means comprises an achromatic doublet lens.

11. Stereoscopic apparatus in accordance with claim 9 wherein each of said lens means comprises a single piece of optical material.

12. Stereoscopic apparatus in accordance with claim 11 wherein each of said lens means comprises a single plano-convex lens element.

13. Stereoscopic apparatus in accordance with claim 6 wherein said optical axes are essentially parallel in essentially all relatively displaced positions of said viewing assemblies.

14. Stereoscopic apparatus in accordance with claim 13 wherein said means for relatively displacing comprises a lateral slide track with both said assemblies mounted thereon with at least one of said assemblies being slidable thereon laterally with respect to the optical axes.

15. Stereoscopic apparatus in accordance with claim 6 wherein the pictorial representation is within a rectangular border and the intersection of the limiting rays of a generally conical field of view with the plane of the pictorial representation is non-rectangular and centered within the pictorial representation borders in non-overlapping relation therewith.

16. Stereoscopic apparatus in accordance with claim 6 wherein said pictorial representations are transparencies and further comprising,
means illuminating the plane of said representations in each of said left and right viewing assemblies from their sides away from the lens means.

17. Stereoscopic apparatus in accordance with claim 16 wherein said means for illuminating comprise an opaque screen exhibiting circular symmetry, and a light bulb at the center of a circle included by said opaque screen.

18. Stereoscopic apparatus in accordance with claim 17 and further comprising reflecting means on lens side of said light bulb for preventing direct illumination of said viewing assemblies.

19. Stereoscopic apparatus in accordance with claim 16 wherein said support means and assembly displacing means maintain the general parallelism of optical axes of said viewing assemblies essentially throughout the range of interpupillary distance adjustments thereof.

20. Stereoscopic apparatus in accordance with claim 16 wherein said means for illuminating comprise translucent screens located one-eighth to one inch beyond each of said planes in said left and right viewing assemblies.

21. Stereoscopic apparatus in accordance with claim 6 and further comprising means for establishing the virtual image of said means for preventing closer to the observer than the virtual image of the pictorial representation in said plane.

22. Stereoscopic apparatus in accordance with claim 21 wherein said means for preventing includes field stops, and the means for establishing the virtual image of said means for preventing closer to the observer than the virtual image of the pictorial representation in said plane comprises means for forming the stereoscopic virtual image of the field stops discernibly closer to the observer than the stereoscopic virtual image of the pictorial representation, essentially throughout the full range of focus adjustments and interpupillary adjustments of said left and right viewing assemblies.

23. Stereoscopic apparatus in accordance with claim 6 and further comprising means for selectively locking at least one viewing assembly to the support means and unlocking the viewing assembly therefrom to allow said relative displacing.

24. Stereoscopic apparatus in accordance with claim 23 wherein said locking and unlocking means comprise an assembly in the viewing assembly of retaining setscrew, driving compression spring, and locking ball locking ball into one of several available openings arrayed along a length of the surface of the support means.

25. Stereoscopic apparatus in accordance with claim 6 wherein each viewing assembly comprises a tubular lens retainer whose length forward of the lens toward the transparency and inner dimensions constitute said means for preventing.

26. Stereoscopic apparatus in accordance with claim 25 wherein said tubular retainer is cylindrical.

27. Stereoscopic apparatus in accordance with claim 25 and further comprising,
means defining an eyepiece assembly including an eye-relief portion extending behind the lens to establish eye spacing from the lens and from the forward end of said tubular retainer in order to position the observer's eye to accept no wider cone of light rays than the desired cone just grazing the inside front end of said tubular retainer.

28. Stereoscopic apparatus in accordance with claim 27 and further comprising means for selectively adjusting the spacing between the lens and the transparency.

29. Stereoscopic apparatus in accordance with claim 28 wherein said last mentioned means for selectively adjusting comprise an assembly of two threaded telescoped pieces with multiple leads and means for selectively locking the two pieces against relative longitudinal movement and unlocking them to allow such movement.

* * * * *

UNITED STATES PATENT OFFICE
CERTIFICATE OF CORRECTION

PATENT NO. : 3,980,394
DATED : September 14, 1976
INVENTOR(S) : Kenyon L. Zapf

It is certified that error appears in the above-identified patent and that said Letters Patent are hereby corrected as shown below:

Column 1, line 67, change "larger" to -- large --.

Column 4, line 50, change "of of" to -- of the --.

Column 6, line 43, after "inches" insert -- apart --.

Column 8, line 43, change "amount" to -- mount --.

Column 9, line 65, spell "assembly" correctly.

Column 10, line 53, transpose "graze" and "just".

Column 14, lines 3-9, claim 24 should read as follows: --

24. Stereoscopic apparatus in accordance with claim 23 wherein said locking and unlocking means comprise an assembly of retaining set-screw, compression spring, and locking ball in the viewing assembly for driving the locking ball into one of several available openings arrayed along a length of the surface of the support means --.

Signed and Sealed this

Eighth Day of February 1977

[SEAL]

Attest:

RUTH C. MASON
Attesting Officer

C. MARSHALL DANN
Commissioner of Patents and Trademarks